E. R. HEWITT.
CONTROLLING MECHANISM.
APPLICATION FILED MAY 2, 1907. RENEWED SEPT. 15, 1909.
1,110,542.
Patented Sept. 15, 1914.
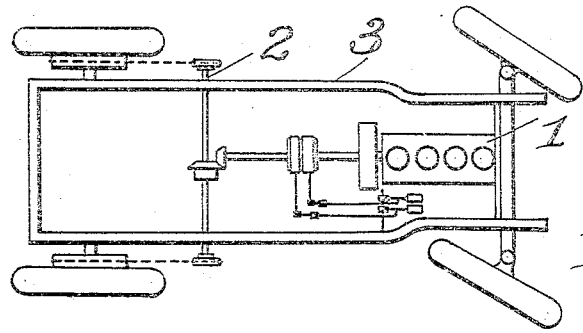
Fig. I.
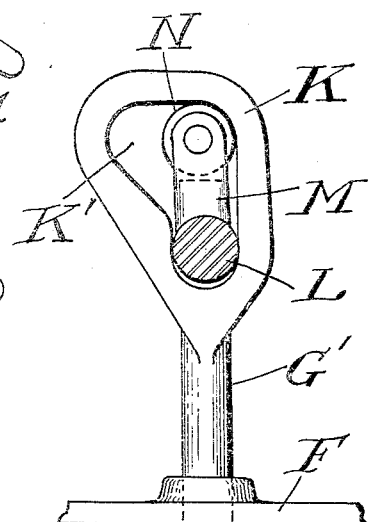
Fig. II.
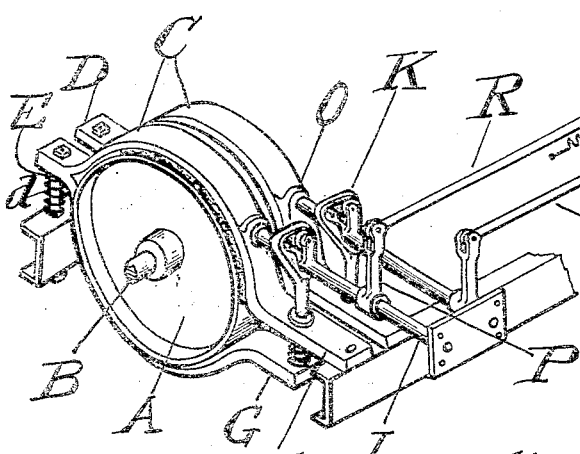
Fig. III.
WITNESSES:
H. Muchmore
Coker F. Clarkson
INVENTOR
Edward R. Hewitt
BY
Hermann F. Cuntz
ATTORNEY.

UNITED STATES PATENT OFFICE.

EDWARD R. HEWITT, OF RINGWOOD, NEW JERSEY, ASSIGNOR TO HEWITT MOTOR COMPANY, OF NEW YORK, N. Y., A CORPORATION OF NEW YORK.

CONTROLLING MECHANISM.

1,110,542.  Specification of Letters Patent.  Patented Sept. 15, 1914.

Application filed May 2, 1907, Serial No. 371,457. Renewed September 15, 1909. Serial No. 517,916.

*To all whom it may concern:*

Be it known that I, EDWARD R. HEWITT, a citizen of the United States, and resident of Ringwood, in the county of Passaic, State of New Jersey, have invented certain new and useful Improvements in Controlling Mechanism, of which the following is a specification.

My invention relates to controlling mechanism, and more particularly to means for retarding rotary motion by clutching or braking, and has for its object to provide a more efficient, durable and effective construction than has been heretofore known for similar purposes.

My invention is more particularly concerned with the construction of clutch or brake operating mechanism and while I may apply it in a variety of ways, forms or combinations I have illustrated one embodiment in the accompanying drawings hereunto annexed and forming a part hereof, in which—

Figure 1 is a plan view, partly diagrammatic, of an automobile showing controlling connections with the speed varying mechanism. Fig. 2 is an enlarged view in elevation of the member which directly operates the clutch or brake mechanism. Fig. 3 is a perspective view of the transmission mechanism and the operating or controlling connections.

In these drawings I have illustrated the application of my invention to an automobile provided with a transmission mechanism which includes holding or brake bands subject to great strains and wear, and requiring nicety of adjustment and reliability in operation. The transmission is controlled by the operator of the automobile through levers or foot pedals and linkage therefrom to a rocker shaft engaging with the brake-band operating rods.

In the structure illustrating one embodiment of my invention A is a rotating drum mounted on a shaft B and encircled by a band C. The shaft B and drum A are duplicated in the same mechanism, and which, as illustrated, is the usual planetary system of variable speed mechanism. In this system the shaft is directly or indirectly connected with an engine 1 shown in Fig. 1, and another shaft passes from the transmission mechanism to a jack-shaft 2, the engine transmission and jack-shaft being mounted on a frame 3, which is supported in the usual way on wheels, the whole being driven by connections from the jack-shaft to the adjacent wheels.

To vary or control the speed of the vehicle the rotation of the drums A in the transmission mechanism must be resisted. This is effected by the band C which is anchored at its middle by the lug D and bolt d, the latter being engaged with the lug and secured to a portion of the frame of the vehicle adjacent to the transmission. A spring E is preferably disposed between the lug D and the fixed part of the frame to give a yielding support for the band C at one point. On the opposite or open side of the brake-band C, one end F is anchored to a rigid part of the frame of the vehicle, while the other end G is free to be moved to and from the anchored end F. The movement of the free end G is effected by a rod G' which passes through said free end of the band and is provided with nuts H which abut against the under-face of the band. A spring J surrounds the operating rod G' between the two ends of the brake-band and tends to hold the ends in spaced relationship. The rod G' is mounted in a substantially vertical position and held therein by a bearing in the fixed end of the band C through which the rod passes. The upper end of the operating rod G' is fastened into or has attached to it a head K with an internal cam aperture K' through which passes an oscillating rod L having an arm M slotted at its end and carrying in the slot a roller N. The oscillating rod L is supported on bearings attached to a fixed part of the frame proper, while one end may be supported in a lug O integral with the brake-band and in close proximity to the stationary end thereof. This rod L has an integral or otherwise rigidly secured arm P to which is attached an operating rod R, the other extremity of which is in operative connection with a foot pedal S mounted for limited oscillation on a rock shaft T, the latter being mounted in bearings or fixed to a rigid portion of the frame of the vehicle whereby it is maintained in fixed relationship with the rocker shaft L.

For the second brake-band adjacent to the band C, just described, a duplication of operating parts is used, the control of which is effected by a pedal S′ adjacent to the pedal S, operating through a rod R′ corresponding to the above described rod R, whereby the entire control of the mechanism is brought within convenient reach of the operator when on the driver's seat.

In the embodiment of my invention just described, the operator of the vehicle when moving the pedal S by foot pressure, rocks the shaft L by means of the rod and arm connection and thereby oscillates the operating arm M with the roller N, the latter being in engagement with the upper side of the cam aperture K′. The arm M may be rocked through an angle which, as will be seen in Fig. 2, may approximate forty-five degrees.

The first rotary motion of the shaft L moves the arm M from its extreme lateral position in the internal cam opening toward its vertical position. Owing to the angularity of the arm in its lateral position with respect to the operating rod G′, the vertical displacement of the operating rod G′ for each degree of rotation of the rocker shaft L is greatest at the beginning of the application of the brake-band. This initial quick action takes up all the slack in the brake, bringing it rapidly toward the drum A. When in contact with the drum A a slippage occurs until the pressure between the two surfaces is increased to the necessary amount. This increased pressure involves only the slightest movement of the members as compared with the initial application of the brake, and, owing to the particular form of the internal cam opening, the requirement of excessive pressure is at a time when the actuating arm M has closely approached the vertical or final position, so that the further movement of the operating pedals S or S′ effects little actual movement in the brake operating rod, but, on the contrary, affords, in view of the relation of the parts, the most effective leverage conditions for increasing the pressure.

In another respect the actuation of the brake operating mechanism is particularly advantageous, namely, in preserving the alinement of the brake-band parts at all times during their application or release. This will be understood when considering that the rod G′, being fixedly secured at its lower end in the free end of the brake-band, passes through a long bearing in the stationary end of the brake-band. In ordinary constructions this would result in cramping or twisting out of plane the brake-band parts. In a structure embodying my invention, the difficulties just mentioned are lation may be insured by the close fit of the rocker-shaft in the lower portion of the opening K′ in the head of the rod G′.

When the brake-band is released and the operating arm M is in off position, the operating head K drops down under the action of the spring J, while immediately after the application of the brake-band has commenced, the head is raised and in its upward movement the lower portion of the opening with its parallel sides is in engagement with the fixed rocker shaft L in the parallel-sided portion at the base of the opening.

In my preferred form I construct the brake-band of a single piece, since I can thereby utilize the elasticity of the metal to some extent to release the band from the clutch. I prefer, however, to use additional releasing means, such as the spring J which is made of sufficient strength and size to positively expand the brake-band when the operating pedal S is released.

The operating pedal or pedals may also be restored to their off position by springs suitably connected. While the first effect of the expanding of the spring J is to throw the lower half of the brake-band away from the brake drum, there is a coöperation with the yielding anchorage of the lug D on the spring E, so that the spring E will press the lug D upward as soon as the spring J has moved the free end of the brake-band sufficiently, whereby the action of the spring E releases the upper half of the brake-band from the drum. This combination of releasing spring, fixed anchorage and yielding anchorage enables me to effect an absolute disengagement of the drum and brake-band, and at the same time avoidance of drag can be effected with a smaller amount of clearance between the band and drum in the off position than has heretofore been possible. This advantageous feature of the construction is, however, aided and in many cases may be due entirely to the combination with the particular anchorage system, of the means heretofore described for operating the brake. A small clearance in other actuating means which would tend to twist or laterally move the brake-band, would cause a drag, and consequently necessitate an increasing of the clearance. With the small clearance which is made possible by the use of my invention, it becomes necessary to accurately adjust the band with relation to the drum and the fixed points of attachment. The anchorage of the brake-bands shown in the particular form illustrated is peculiarly adapted to facilitate ment. After the setting of the upper half, the adjustment of the lower half of the brake-band is effected by taking up or letting out on the nuts H on the operating rod G'. In the case of wear or strain it will be seen readily that a readjustment can be made with the utmost facility and accuracy. It will furthermore be seen that my anchorage system for the brake-band is such that upon application of the brake the giving with its shaft and associated parts are not strained out of alinement.

While I have shown my invention as embodied in one particular structure, it will be understood that various modifications may be made in form or material, and also that the adaptation of my invention may be in connection with various other apparatuses without departing from the spirit of the invention.

What I claim as new and desire to secure by Letters Patent is:

1. In combination in a brake or clutch operating mechanism, a brake-band having a free end and a fixed end, an operating rod in operative engagement with the free end, the fixed end coöperating with the rod as a guide therefor, and means for actuating said operating rod, said means coöperating with the rod as a second and positive guide to hold the same against lateral and twisting movement whereby the alinement of the parts of the brake-band is preserved.

2. In combination in a brake or clutch operating mechanism, a brake-band having a fixed end, and a free end, an operating rod in operative engagement with the free end and provided with a cam aperture, and a rocker shaft mounted in fixed relation to the fixed end of the brake-band, and coöperating with said aperture to insure a true axial movement of the operating rod.

3. In combination in a brake or clutch operating mechanism, a brake-band having a fixed end and a free end, an operating rod in operative engagement with the free end and provided with a cam aperture, and a rocker shaft mounted in fixed relation to the fixed end of the brake-band and coöperating with said aperture to actuate the operating rod and insure a true axial movement thereof.

4. In combination in a brake or clutch operating mechanism, a brake-band having a free end and a fixed end, an operating rod in operative engagement with the free end and means for actuating said operating rod, said means coöperating with the rod as a positive guide therefor to insure true axial movement thereof.

5. The combination in a controlling mechanism of a brake-band having a fixed end, a free end and a yielding support intermediate the ends, an operating rod operatively connected to the free end and provided with a cam opening, a rocker arm coöperating with the cam opening to actuate the operating rod, the arm being disposed to give quick initial movement of the operating rod and slow final movement with proportionate greater leverage.

6. The combination in a controlling mechanism, of a brake-band having a fixed end and a free end, an operating rod operatively connected to the free end and provided with a cam opening and a lower portion provided with parallel sides, a rocker shaft coöperating with the parallel sides to form a guide for the rod, and a rocker arm mounted on the rocker shaft and coöperating with the cam opening to actuate the operating rod.

7. The combination in a mechanism for controlling coöperating rotary parts, of an operating rod provided with an opening having a cam surface formed on its periphery, a rocker arm in operative engagement with the cam surface, and means to oscillate said rocker arm including an operating lever operatively connected thereto, the rocker arm being disposed to impart variable displacement to the operating rod upon uniform actuation of the operating lever.

8. The combination in a mechanism for controlling coöperating rotary parts of a brake-band, an operating rod therefor provided with an opening having a cam surface formed on the periphery, a rocker arm in operative engagement with the cam surface, a rocker shaft on which the rocker arm is carried, a bearing carried by the brake-band in which said rocker shaft is mounted, said bearing being independent of the connection between the brake-band and the operating rod, and means to oscillate said rocker arm including an operating lever operatively connected thereto, the rocker arm being disposed to impart variable displacement to the operating rod upon uniform actuation of the operating lever.

9. In combination with a rotary member, means to brake the same including a brake-band having a fixed end and a free end, operating levers therefor mounted to oscillate about an axis substantially at right angles to the axis of the rotary member, a rocker shaft substantially mounted in parallelism with the axis of oscillation of the operating lever, an operating rod operatively connected to the brake-band, means to insure true axial movement of said rod along a line at right angles to the axis of the rocker shaft and in the plane of the brake-band, and a bearing for said rocker shaft in fixed relation to the stationary end of the brake-band.

10. In combination in a brake mechanism, a brake-band having a fixed end and a free end and a yielding support intermediate the ends, a rocker shaft having its axis substantially in the plane of the brake-band, a bearing for the rocker shaft on the brake-band adjacent the fixed end, means connecting operatively the rocker shaft and the brake-band and means to actuate the rocker shaft.

In testimony whereof I have signed my name to this specification at the borough of Manhattan, city and State of New York, on the 30th day of April, 1907, in the presence of two subscribing witnesses.

EDWARD R. HEWITT

Witnesses:
 HERMANN F. CUNTZ,
 GEORGE A. WARD.